US010678243B2

(12) United States Patent
Luo

(10) Patent No.: US 10,678,243 B2
(45) Date of Patent: Jun. 9, 2020

(54) SYSTEMS AND METHODS FOR SCALABLE ELECTRICAL ENGINEERING (EE) ARCHITECTURE IN VEHICULAR ENVIRONMENTS

(71) Applicant: SF Motors, Inc., Santa Clara, CA (US)

(72) Inventor: Yong Luo, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 104 days.

(21) Appl. No.: 15/895,711

(22) Filed: Feb. 13, 2018

(65) Prior Publication Data
US 2019/0250610 A1 Aug. 15, 2019

(51) Int. Cl.
G05D 1/00 (2006.01)
G05D 1/02 (2020.01)
B60W 50/00 (2006.01)

(52) U.S. Cl.
CPC ....... *G05D 1/0088* (2013.01); *B60W 50/0098* (2013.01); *G05D 1/027* (2013.01); *G05D 1/0246* (2013.01); *G05D 1/0278* (2013.01); *B60W 2050/0006* (2013.01); *B60W 2050/0094* (2013.01); *B60W 2420/42* (2013.01); *B60W 2420/52* (2013.01); *B60W 2556/50* (2020.02)

(58) Field of Classification Search
None
See application file for complete search history.

(56) References Cited

U.S. PATENT DOCUMENTS

| 2012/0218412 A1* | 8/2012 | Dellantoni ......... G01C 21/3602 348/148 |
| 2013/0204493 A1 | 8/2013 | Ricci et al. |
| 2018/0025430 A1* | 1/2018 | Perl .................... G01C 21/3697 705/4 |
| 2018/0075380 A1* | 3/2018 | Perl .................... G06Q 10/0635 |
| 2019/0163178 A1* | 5/2019 | Sidle .................... G05D 1/0077 |

FOREIGN PATENT DOCUMENTS

FR 3031406 7/2016
WO WO-2010/144900 12/2010

OTHER PUBLICATIONS

International Search Report and Written Opinion for PCT/US2018/025887 dated Oct. 29, 2018.

* cited by examiner

*Primary Examiner* — Thomas G Black
*Assistant Examiner* — Demetra R Smith-Stewart
(74) *Attorney, Agent, or Firm* — Foley & Lardner LLP

(57) ABSTRACT

Provided herein are systems and methods of operating electronic controller units (ECUs) across multiple ECU domains in an automotive configuration. A first advanced driver-assistance system (ADAS) environmental sensor can generate a first output. A sensor connectivity switch can direct the first output to a first ECU in one of the non-ADAS domains to generate a second output. Each of the non-ADAS domains can include at least one ECU. A second ECU in a domain for ADAS can use the second output to perform an ADAS operation or autonomous driving in vehicular environments.

20 Claims, 6 Drawing Sheets

SYSTEMS AND METHODS FOR SCALABLE ELECTRICAL ENGINEERING (EE) ARCHITECTURE IN VEHICULAR ENVIRONMENTS

BACKGROUND

Vehicles such as automobiles can include sensors to gather information related to vehicle operation or to the environment about the vehicle. This information can indicate a status of the vehicle or environment conditions for autonomous driving.

SUMMARY

The present disclosure is directed to systems and methods for an electrical engineering (EE) architecture network. The disclosed EE architecture network can allow for scaling, integration, and migration flexibility for various functions in electrical vehicle (EV) settings for instance. This can allow for enhanced automotive operational capabilities, and also capabilities for simulation and pre-production testing to satisfy vehicle development requirements.

At least one aspect is directed to a system for operating electronic controller units (ECUs) across multiple ECU domains in an automotive configuration. The system can include a plurality of advanced driver-assistance system (ADAS) environmental sensors of a vehicle. The plurality of ADAS environment sensors can include a global positioning system (GPS) sensor, an inertial measurement unit (IMU) sensor, and a camera. The system can include a plurality of ECU domains of the vehicle, including a domain for ADAS and a plurality of non-ADAS domains including a telematics domain with navigation map and an infotainment domain with high-definition (HD) map. Each of the ECU domains can include at least one ECU. The system can include a sensor connectivity switch disposed within the vehicle. The sensor connectivity switch can direct a first output of a first sensor of the plurality of ADAS environmental sensors, to a first ECU disposed within the vehicle and in one of the plurality of non-ADAS domains to generate a second output. A second ECU disposed within the vehicle and in the domain for ADAS can use the second output to perform an ADAS operation.

At least one aspect is directed to a method of operating electronic controller units (ECUs) across multiple ECU domains in an automotive configuration. A first sensor of a plurality of advanced driver-assistance system (ADAS) environmental sensors of a vehicle can generate a first output. The plurality of ADAS sensors can include a global positioning system (GPS) sensor, an inertial measurement unit (IMU) sensor, and a camera. A sensor connectivity switch can direct the first output to a first ECU in one of a plurality of non-ADAS domains of the vehicle to generate a second output. The plurality of non-ADAS domains can include a telematics domain and an infotainment domain. Each of the non-ADAS domains can include at least one ECU disposed within the vehicle. A second ECU disposed within the vehicle and in a domain for ADAS can use the second output to perform an ADAS operation.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
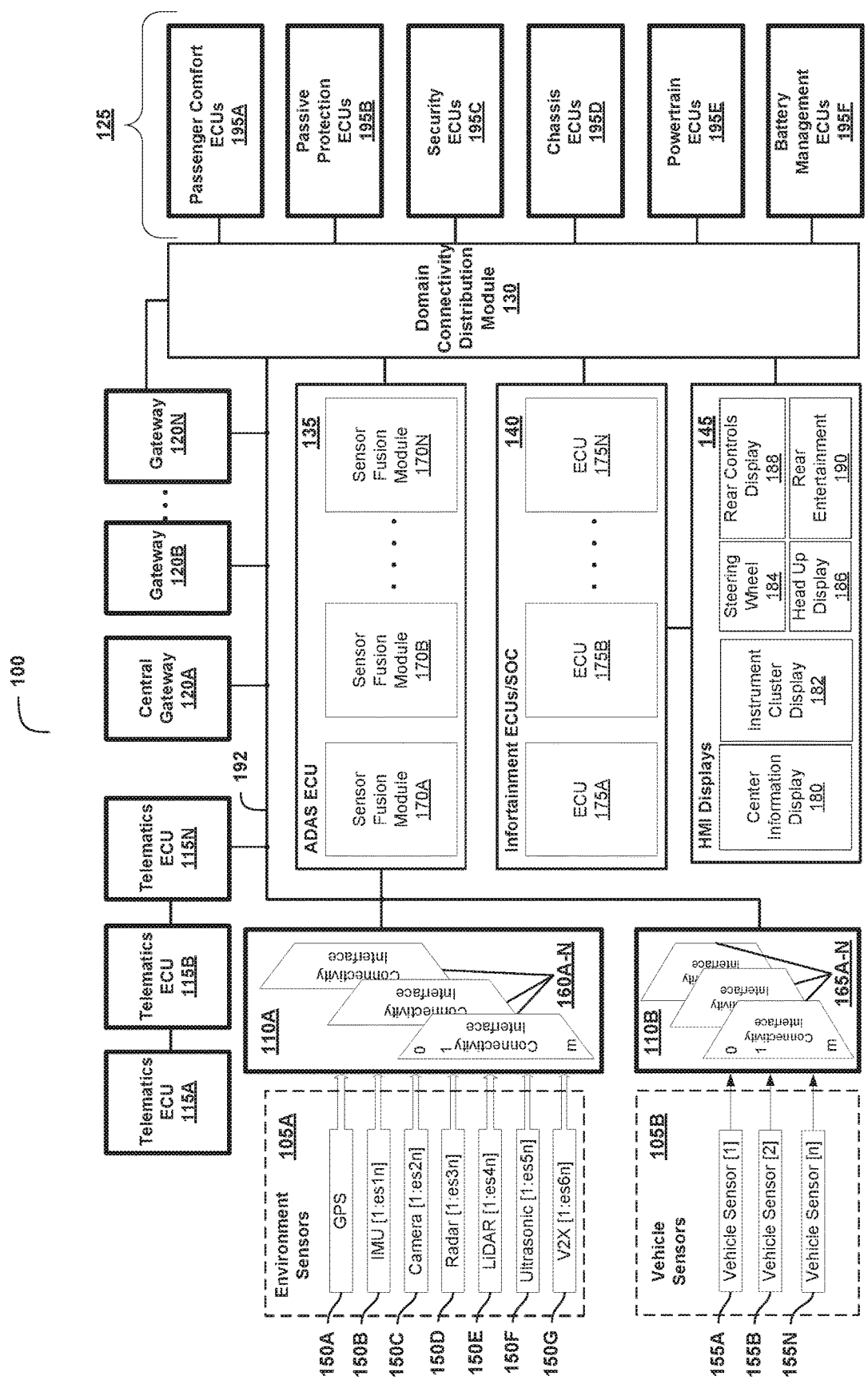
FIG. 1 is a block diagram depicting an example system architecture for scaling in an electronic vehicle.

Following below are more detailed descriptions of various concepts related to, and implementations of, methods, apparatuses, and systems of operating electronic controller units (ECUs) across multiple ECU domains in an automotive configuration. The various concepts introduced above and discussed in greater detail below may be implemented in any of numerous ways.

Described herein are systems and methods of operating electronic controller units (ECUs) across multiple ECU domains in an automotive configuration. An automotive configuration refers to a configuration, arrangement or network of electrical, electronic, mechanical and/or electromechanical devices within a vehicle of any type. For instance, an automotive configuration can include a vehicle's power train, infotainment, climate control and other subsystems. The automotive configuration can be part of an electrical engineering (EE) architecture for electrical vehicles (EVs) for instance. EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. EVs can contain a multitude of ECUs networked together for communicating and interfacing with one another. An ECU can be an embedded system that controls one or more of the electrical system or subsystems in a transport vehicle. An ECU is sometimes referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS), and so on.

ECUs can be used in multiple settings related to EVs and can operate in different domains. For example, in advanced drive-assistance systems (ADAS), there can be over a hundred ECUs communicating with one another through a vehicle EE architecture network. In addition, various environment sensors and other sensing components (e.g., global position system (GPS), inertial measurement unit (IMU), camera, Radar, LiDAR, ultrasonic sensor, and vehicle-to-everything (V2X) wireless sensors) can each be connected to a different, dedicated ECU for data acquisition, process, or vehicle control purposes. Other applications in which ECUs are used can include passenger comfort systems, security systems, chassis, body, powertrain and battery management systems, among others. With an ever increasing number of ECUs in EVs, the overall EV operation can be increasingly reliant on real-time communication between cross-domain ECUs through the EE architecture network.

The integration of additional components can complicate the EV EE architecture network with added system stacks. For example, EVs with an ADAS with wireless communication connectivity can be integrated with various other components, such as an in-vehicle infotainment system, an interactive entertainment display, a user interface for different user experience, navigation with voice recognition and audio applications, among others. Each of these components integrated with the ADAS can each have driver state response requirements from different level of autonomous driving capabilities, resulting in far complex system architecture. The system software stack on the communication network of the EV EE architecture can also be complicated. With new, different automotive communication interface standards, the growing number of automotive in-vehicle system applications can raise communication signal bandwidth and speed requirements of the EE architecture. Additionally, automotive original equipment manufacturers (OEMs) can be adding custom computing capabilities through various ECU system integration into the EE architecture. These custom computing capabilities can add to the complexity of the vehicle system applications, including wired and wireless connectivity between ECUs of the EE architecture network.

To address the increasing computing processing requirements and the use of multiple communication protocols, the present systems and methods disclosed herein provide for a scalable EE architecture for EV settings with at least two functionalities. The EE architecture can include a multi-core computing platform to handle increasing complexity of the software system layer stack-up. The multi-core computing platform of the EE architecture can also allow for cross-functional domain applications with different protocol interfaces with varying signaling and communication channel bandwidth requirements. The EE architecture can also support a variety of different communication protocol interfaces with multiple channels. The EE architecture can provide resource management and coordination across various domains and subsystems, for instance via the use of a multi-protocol sensor input connectivity channel multiplexer, a domain connectivity distribution module, and/or a central gateway. This can for instance result in better resource and bandwidth utilization within an automotive configuration as compared to existing systems with fragmented subsystems that operate independently of each other, each with their own resources that are usually over-designed and under-utilized most of the time.

The resource coordination can for instance direct certain sensor data to specialized ECUs such as ADAS ECUs, and certain other sensor data to other available ECUs for partial or full processing, before being used or further processed by a specialized ECU. Thus, the present solution provides intelligent load balancing and distribution across heterogeneous subsystems (e.g., ECUs) available within an automotive configuration, which can help achieve certain functionality (e.g., ADAS features) that is presently not possible or handled only by specialized, dedicated devices in conventional systems. For example, certain specialized automotive functions like some ADAS functions (e.g., automatic braking), can use data from an increasing number of sensors to decide how and when to operate. Instead of directing all of these various data to ADAS ECUs for handling, which can overwhelm or be limited by existing ADAS ECU capabilities and resources, the present EE architecture can provide intelligent load balancing and distribution of certain less-specialized (or low level) processing (e.g., GPS data processing) to/across non-ADAS ECUs or resources, and manage these processing to be completed in parallel or in a coordinated fashion, so that various results from the distributed processing can be received and combined within defined time limits (e.g., at an ADAS ECU) to perform the specialized automotive function.

For example, a vehicle can include a plurality of ADAS environmental sensors. The plurality of ADAS environment sensors can include a GPS sensor, an IMU sensor, and a camera. The vehicle's EE architecture can include a plurality of ECU domains of the vehicle, including a domain for ADAS and a plurality of non-ADAS domains including a telematics domain and an infotainment domain, each of the ECU domains including at least one ECU. The EE architecture can include a sensor connectivity switch disposed within the vehicle, that can direct an output of a GPS sensor from the plurality of ADAS environmental sensors, to an available and suitable ECU for processing GPS data, such as a first ECU disposed within the vehicle and in a non-ADAS domain (e.g., a telematics domain with navigation map) to generate a second output. The EE architecture can recognize that the GPS data does not have to be sent to an ADAS ECU for direct processing, and can be offloaded to another ECU to generate an intermediate output that can be used for ADAS operations. A domain connectivity switch of the EE architecture can then direct the second output (intermediate output) to an ADAS ECU for additional processing or use. Hence, a second ECU disposed within the vehicle and in the domain for ADAS can use the second output to perform an ADAS operation.

The scalable EE architecture can separate the computing processing and communication protocol requirements into application-specific scalable modules. The scalable EE architecture can include input interfaces for environment sensors and other sensing components through a multi-protocol sensor input connectivity channel multiplexer. A gateway configuration of the EE architecture can be scalable based on fault-tolerant requirements, for example. Hardware and software for the gateway can use the multi-core computing platform or processing power to handle the increased computing processing system requirements. Additionally, the EE architecture can include a connectivity domain distribution switch for each domain subsystem configuration on ECUs. The connectivity domain distribution switch can be implemented using a field-programmable gate array (FPGA) or an applications-specific integrated circuit (ASIC) device with a software-integrated solution for multiple protocol peripheral interface expansion. In-vehicle infotainment (IVI) ECUs and human-machine interface displays in the EE architecture can also support and fault-tolerant features as well. In this manner, the EE architecture can operate robustly through scaling, integrating, and migration flexibility for functional enhancement. Furthermore, the EE architecture can allow for simulation and pre-production testing to verify that the various components satisfy vehicle development requirements.

The scalable EE architecture network can support any number of communication protocol standards, such as Controller Area Network (CAN), CAN with Flexible Data-Rate (CAN FD), Local Interconnect Network (LIN), FlexRay, Media Oriented Systems Transport (MOST), Ethernet, Serial Peripheral Interface (SPI), Peripheral Sensor Interface (PSIS), Distributed Systems Interface (DSI), and Single Edge Nibble Transmission (SENT), among others. The scalable multi-protocol connectivity domain distribution switch can use a configurable input to interface with a number of scalable gateway devices from 1 to n. The switch can further use a configurable output to interface with all vehicle domain system ECUs. The ECUs can communicate with a scalable gateway platform of one or more gateway ECUs that can incorporate features of a central gateway architecture, backbone architecture, software gateway architecture or mixed architecture through the EE architecture network. Any of the ECUs can communicate messages that can include commands, data or both through the described EE architecture network. The scalable gateway EE architecture can include multiple mixed technology and protocol interfaces to allow for data exchange among the connected subnetworks. The scalable multi-protocol connectivity domain distribution switch can also allow for network communication with low or reduced latency and jitter to reduce conventional gateway device latencies, through system design tradeoffs to optimize hardware and software partitions. The scalability of the EE architecture can therefore include enhancement of high network utilization and scalable high throughput on reduction of EE architecture network communication latency, jitter, and frame loss.

A number of components can be integrated as part of the EE architecture network to boost scalability and carry on the corresponding functionalities. The EE architecture network can include telematics ECUs scalable using multiple channel bandwidth aggregation to enhance wireless communication signal bandwidth and session persistence. Configurations of the gateway in the EE architecture network can include a central gateway architecture, a backbone gateway architecture, a software gateway architecture, or mixed architecture, with localized configuration in daisy chain with redundant paths or fully meshed configuration with a redundant backbone. The scaling of the in-vehicle EE architecture network can depend on scalable gateway configurations to reduce inter-protocol network communication latency across a wide range of vehicle functional domain ECUs.

Further, the scalable gateway configuration can be integrated with a multi-protocol communication switch. To scale, the multi-protocol communication switch can include network communication routing capability expansion using communication protocol standard optimized data speed through communication protocol specific minimization of data network latency, jitter, and frame loss. There can also be a multi-protocol sensor input connectivity channel data multiplex for communicating vehicle sensor input interface data for scalable gateway data input in a heterogeneous environment based on configured protocol interface. The EE architecture can also further include a fail-safe functional features for multi-layer gateway device scaling with a multi-protocol connectivity domain distribution system bus interface communications. The environment sensors and other sensing components of the ADAS in the EE architecture can be scaled based on connectivity data input multiplexing with routing channel scaling requirement. A matrix of the multi-protocol connectivity domain distribution switch can scale the inputs and outputs to route the data proportionally to the interface capabilities of the connected gateways devices to all vehicle domain ECUs throughout the EE architecture.

In addition, an ADAS ECU sensor fusion module of the EE architecture can be scaled for heterogeneous ADAS sensor data acquisition and modularized processing through scalable localized configurations. An HMI display controller can be scalable with redundancy and fail-safe functional feature built-in for center information display (CID), instrument cluster display (ICD) and steering wheel display (SWD), and fail-safe HMI display ECU scaling configurations. Redundant sensors interfaces and ECUs can be scaled through connectivity input multiplexer(s) (mux) and domain distribution matrix for fail-safe functional operation. The EE architecture's scalability via sensor input multiplex and domain distribution matrix can allow for implementation of multi-layer vehicle system security.

Referring to FIG. 1, among others, depicted is a scalable EE architecture 100 for an EV or other vehicular platform. The scalable EE architecture 100 of a vehicle can include a set of environment sensors 105A, a set of vehicle sensors 105B, an environment sensor connectivity interface 110A, a vehicle sensor connectivity interface 110B (110A, 110B are each sometimes referred to as a sensor connectivity switch or sensor connectivity input channel) one or more telematics ECUs 115A-115N, a central gateway 120A and one or more auxiliary gateways 120B-N, one or more vehicle system ECUs 125, a domain connectivity distribution module 130 (sometimes referred to as a domain connectivity distribution switch or a domain connectivity switch), a set of ADAS ECUs 135, a set of infotainment ECUs 140, a set of human-machine interface (HMI) displays 145, or a bus 192, among other components. These components can be hosted on or within a single vehicle, such as an EV. By way of a non-limiting example, an environmental sensor can provide GPS information as output, which is directed to an available ECU (e.g., a telematics ECU) by the environment sensor connectivity interface 110A for processing. The output of the telematics ECU can be directed by the domain connectivity distribution module 130 to a specific ECU (e.g., an ADAS ECU) for combination with other data to perform an ADAS operation, for instance.

The set of environment sensors 105A can include a global position system (GPS) unit 150A, an inertial measurement unit (IMU) 150B, a camera 150C, a Radar unit 150D, a light detection and ranging (LIDAR) unit 150E, an ultrasonic unit 150F, a vehicle-to-everything (V2X) unit 150G (e.g., vehicle-to-everything (V2X) sensor, a vehicle-to-vehicle (V2V) sensor, a vehicle-to-infrastructure (V2I) sensor, a vehicle-to-device (V2D) sensor, or a vehicle-to-passenger (V2D) sensor), among others. The set of environment sensors 105A can include multiple ones of, or a set of one or more of, any of one the foregoing sensors. The set of vehicle sensors 105B can include one or more vehicular sensors 155A-N (e.g., tire pressure gauge, thermometer, speedometer, and so on). The environment sensor connectivity interface 110A can include interconnectivity mechanisms such as one or more multiplexers 160A-N. The vehicle sensor connectivity interface 110B can include interconnectivity mechanisms such as one or more multiplexers 165A-N. The set of ADAS ECUs 135 can include one or more sensor fusion modules 170A-N. The set of infotainment ECUs 140 can include one or more infotainment ECUs 175A-N. The set of HMI displays 145 can include a center information display 180, an instrument cluster display 182, a steering wheel display 184, a heads up display 186, real controls display 188, or a rear entertainment unit 190, among others. The set of vehicle ECUs 125 can include a set of passenger control ECUs 195A, a set of passive protection ECUs 195B, a set of security ECUs 195C, a set of chassis ECUs 195D, a set of powertrain ECUs 195E, or a set of battery management ECUs 195F, among others.

Each of the components of the scalable EE architecture 100 can be implemented using hardware or a combination of software and hardware. Each component in the EE architecture 100 such as any of the ECUs, one or more gateways 120A-N, one or more subcomponents of the HMI displays 145, and the domain connectivity distribution module 130, can include logical circuity (e.g., a central processing unit) that responses to and processes instructions fetched from a memory unit. Each electronic component of the EE architecture 100 can be provided by a microprocessor unit. Each electronic component of the EE architecture 100 can be based on any of these processors, or any other processor capable of operating as described herein. The central processing unit can utilize instruction level parallelism, thread level parallelism, different levels of cache, and multi-core processors. A multi-core processor can include two or more processing units on a single computing component.

The main memory unit in each electronic component of the EE architecture 100 can include one or more memory chips capable of storing data and allowing any storage location to be directly accessed by the central processing unit. The main memory unit can be volatile and faster than storage memory. Main memory units can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). The central processing unit in each electronic component of the architecture 100 can communicate with the main memory unit via a system bus.

The various components of the scalable EE architecture 100 can be connected or communicatively coupled to one another in the manner depicted in FIG. 1 for example. Outputs of the sensors 150A-N of the set of environment sensors 105A can be connected to the multiplexers 160A-N of the environment sensor connectivity interface 110A. Outputs of sensors 155A-N of the set of vehicle sensors 105B can be connected to the multiplexers 165A-N of the vehicle sensor connectivity interface 110B. The environment sensor connectivity interface 110A, the vehicle sensor connectivity interface 110B, the one or more telematics ECUs 115A-N, the one or more gateways 120A-N, the sensor fusion modules 170A-N of the set of ADAS ECUs 135, and the domain connectivity distribution module 130 can be connected to the bus 192 to interface and communicate with one another. The domain connectivity distribution module 130 can also be connected to the one or more gateways 120A-N, the sensor fusion modules 170A-N of the set of ADAS ECUs 135, the set of infotainment ECUs 140, the various components of the HMI displays 145, and the set of vehicle system ECUs 125 to interface with one another, among others. The connection between the various components of the scalable EE architecture 100 can be wired or wireless, or any combination thereof.

The gateways 120A-N can direct or route communication between various components in automotive or EV settings. Each gateway 120A-N can define or specify routing information for data frames and signals across the various communication channels interfacing with other components of the EV environment. The gateway 120A-N can be software-based (a combination of software and hardware) or solely hardware-based. The software-based gateways 120A-N can be a combination of software and hardware implemented using a central processing unit (CPU) to execute software. Such gateways 120A-N with the combination of software and hardware can be limited by performance of the central processing unit therein and may not be optimized for routing operations. Each ECU interfacing with the one or more gateways 120A-N can have different network communication or routing specifications. As the number of interfaces and the total signal bandwidth of each gateway 120A-N increases, the performance of the gateways 120A-N with such combinations can deteriorate and can be unable to handle all the incoming network traffic in a specified time. Some gateways 120A-N with central processing units with speed around 150 MHz or more for instance can consume a high amount of electronic power, and can suffer from high electromagnetic interference (EMI). For EV environments, gateways 120A-N implemented using hardware can be more efficient than gateways 120A-N implemented using a combination of software and hardware.

The configuration of the gateway 120A-N can affect several other components in automotive or EV environments. In automotive applications, the comfort of passengers in the vehicle can be affected by failures in the central gateway 120A and the EE architecture network 100. Due to the central network routing and channel switching functionalities of the gateways 120A-N in communicating with multiple ECUs with different protocol interface standards, introducing another new gateway device to the EE architecture 100 can be difficult. In particular, the addition of more gateways 120B-N can increase latencies. The latencies of the gateways 120A-N can include generation latency in generating and processing signals, transmission latency in sending the generated signals through the EE architecture 100, and receipt latency from receiving signals from other components, among others. Another cause of latencies in the gateways 120A-N can be traversal of the software network stack. Considering the relatively unchanging topology of automotive communication networks, parameters such as the number of network nodes and the network topology itself can be predetermined and can remain static even during runtime.

The latencies in gateways 120A-N can depend on the configuration of various components in the EE architecture 100 in the EV, the number of network nodes in the EE architecture 100 transmitting and receiving communications, and synchronization in time among the myriad components, among others. One type of latency that can be reduced or optimized through scaling can correspond to a worst-case execution time at each gateway 120A-N. The worst-case execution time at each gateways 120A-N can depend on the scalable EE architecture 100, for instance in the number of domain interfaces on the EE architecture 100, or network load of the bus 192. The complexity of the execution at the gateway 120A-N can be affected by signal and clock jitter, channel scalability, signal bandwidth, and network aggregated throughput. In vehicle communication systems, the jitter can be the undesired deviation from an assumed periodic signal or message. The periodic jitter ($J_p$) of the network communication message (m) with an assumed cycle time ($T_0(m)$) can be calculated using the following equation:

$$J_p(m) = T_{cycle}(m,n) - T_0(m)$$

where $T_{cycle}$ denotes the measured cycle time of the cycle n.

Furthermore, the worst-case end-to-end network communication processing time ($T_{e2e}$) can be defined in the following manner:

$$T_{e2e} = T_{RX} + T_P + T_{TX}$$

where $T_{RX}$ denotes a time duration for receiving a message from a source via the network, $T_P$ denotes a time duration for processing the received message, and $T_{TX}$ denotes a time duration for transmitting the processed message to the destination. The time duration for receiving the message can include a propagation time through a communication controller or route to receive the message from the source. The time duration for receiving the message can also include a network configured interruption service routine in transporting the receive message to a corresponding network buffer.

To account for the latencies introduced by gateways 120A-N, the one or more gateways 120A-N of the scalable EE architecture 100 can have dedicated configurations for use in real-time applications in EV settings to reduce jitter and other latencies. A real-time application can relate to applications in which input data is processed within a defined number of milliseconds (e.g., 10 ms, or other value) so that processed data is available virtually immediately as feedback. Such real-time applications can rely on a precise prediction of delays and receipt times in data signals or messages, in addition to faster transmission times. Moreover, the software for gateways 120A-N is often or sometimes not standardized or uniform, resulting in errors and additional consumption of time. To account for discrepancies in the communication protocols of the gateways 120A-N, the configuration of the gateways 120A-N in the EE architecture 100 can provide scalability and flexibility across different communication protocols.

Additionally, the gateways 120A-N of the scalable EE architecture 100 can be scalable and configured in various network architectures, such as a central gateway architecture, backbone gateway architecture, software gateway architecture, or mixed architecture. The network architectures supported by the gateway 120A-N can have localized configuration in daisy chain form with one or more redundant paths and fully meshed configuration with redundant back bone, among others. The gateways 120A-N of the scalable EE architecture 100 can be configured to support multiple mixed technology and protocol interfaces to allow data exchange between connected subnetworks from various components. The scalable EE architecture 100 can be retrofitted onto an existing set of gateways 120A-N.

In the central gateway architecture, there can be one central gateway 120A in the scalable EE architecture 100 to connect all the ECUs across different functional domains for routing of messages, packets, and signals. Functionalities performed by the central gateway 120A can include diagnostic, flash, message mirroring, and network management, among others. This type of network architecture can create higher demands on system performance of the scalable EE architecture 100 and the signal bandwidth on the bus 192, but also can reduce latency in communication over the networks. With having a single central gateway 120a, the operational demands can be high and the central gateway 120A can itself become a single point of failure in some cases. For instance, when computational and other resources in a single device are inadequate to handle multiple concurrent functions, some or all of these functions can fail due to that single device. With the central gateway architecture, however, there is the possibility of providing one central diagnostic access to the automotive network. In contrast, in backbone architecture, each communication subnetwork in the scalable EE architecture 100 can have a dedicated gateway 120A-N connected to a central high-speed connection via the bus 192. This type of network architecture can reduce signal bandwidth consumption through distribution network connections.

With the gateways 120A-N configured to support various network architectures and protocol interfaces, the scalable EE architecture 100 can provide functionality afforded by software-based gateways 120A-N without addition of higher performance hardware, such as a more powerful central processing unit or a larger memory unit. Furthermore, the overall scalable EE architecture 100 with scalable gateways 120A-N can allow for processing tasks in the hardware of each gateway 120A-N without direct communication to other central processing units.

The scalable sensor input channels such as the environment sensor connectivity interface 110A and the vehicle sensor connectivity interface 110B can allow for cascade ring implementation of the bus 192 in the scalable EE architecture 100. The scalable sensor input channels can also allow for an expansion in the number and functionality of gateways 120A-N, multi-protocol implementation of the gateways 120A-N, scaling of telematics ECUs 115A-N, and the inclusion of the domain connectivity distribution module 130. In this manner, the scalable EE architecture 100 can be flexible, and the various components therein can interface with one another in different domains, thereby increasing network communication efficiency. Additionally, the scalable EE architecture 100 can be reconfigurable by modifying the programming of the memory units in each software-based gateway 120A-N or other components therein.

The ECUs of the scalable EE architecture 100 can interface with various vehicle system components, such as via the passenger comfort ECU 195A, passive protection ECU 195B, security ECU 195C, chassis ECU 195D, powertrain ECU 195E, and powertrain ECU 195E, among others. In addition, the ADAS ECUs 135 (sometimes referred to as ECUs of an ADAS domain) can interface with a wide range of environment sensors 150A-G and vehicle sensors 155A-N. The environment sensors 150A-G interfacing with the ADAS ECUs the GPS unit 150A, the IMU unit 150B scaling from 1 to es1n, the camera 150C scaling from 1 to es2n, the Radar unit 150D scaling from 1 to es3n, the LIDAR unit 150E scaling from 1 to es4n, the ultrasonic unit 150F scaling from 1 to es5n, and the V2X wireless sensors 150G (e.g., including vehicle-to-vehicle (V2V), vehicle-to-device (V2D), and vehicle-to-infrastructure (V2I), and vehicle-to-passenger (V2P), etc.) scaling from 1 to es6n, among others. The wide range of sensors interfacing with the ADAS ECUs 135 can use a broad range of sensor interface protocols. For example, the camera unit 150C interfacing with the ADAS ECUs 135 can use Gigabit Multimedia Serial Link (GMSL), Mobile Industry Processor Interface (MIPI) camera serial interface, or Controlled Area Network with Flexible Data- Rate (CAN-FD) interface, among others. The one or more sensor fusion modules 170A-N of the ADAS ECUs 135 can scale the acquired sensor data from 1 to n. The scaling by each sensor fusion module 170A-N can be dynamic to allocate processing resources of the ADAS ECUs 135 in accordance with the sensor data from the set of environment sensors 105A. The one or more sensor fusion modules 170A-N of the ADAS ECUs 135 can combine or otherwise process (e.g., by applying weights, scaling or otherwise) outputs from various processed sensor data (e.g., outputs from one or more ECUs). The output of each sensor fusion module 170A-N of the ADAS ECUs 135 can be communicated through the scalable EE architecture 110 via the bus 192 and through the domain connectivity distribution module 130.

The various domains used in the scalable EE architecture 100 can correspond to different sensor inputs (e.g., GPS, camera, LIDAR), various vehicle systems (e.g., ADAS, infotainment, chassis ECU), or other interface protocols (e.g., CAN, FlexRay). Each domain can have a corresponding ECU, associated physical hardware, and a specified interface protocol. The ECUs of the scalable EE architecture 100 can be divided into one or more ADAS domains and non-ADAS domains (sometimes collectively or generally referred to as domains or ECU domains). Various domains or ECU domains are described further below. Each domain or ECU domain can refer to a defined functionality or grouping of related functionalities, such as for infotainment, ADAS, powertrain management and control, cabin climate control, security, traction control, battery management, telematics, gateway operations, etc.

An ADAS domain (or ADAS ECU domain) comprises functionality and associated devices, software, etc., for supporting or performing ADAS operations (e.g., as opposed to other types of operations such as telematics, infotainment, etc.). For instance, infotainment operations or battery management operations (e.g., performed by an ECU) traditionally or typically do not contribute, support, or provide output for use in ADAS operations, and therefore such operations are considered to be excluded from an ADAS domain, and are instead grouped under non-ADAS domains. However, the present systems and methods can leverage on ECUs in non-ADAS domains to perform certain types of processing (e.g., intermediate processing) to produce outputs (e.g., intermediate outputs or partial results) that can be used or incorporated in ADAS operations.

For example, an EV can include a plurality of ADAS environmental sensors. The plurality of ADAS environment sensors can include a GPS sensor, an IMU sensor, and a camera. The EV's EE architecture can include a plurality of ECU domains of the EV, including a domain for ADAS and a plurality of non-ADAS domains including a telematics domain and an infotainment domain, each of the ECU domains including at least one ECU. The EE architecture can include a sensor connectivity switch disposed within the EV, that can direct an output of a GPS sensor from the plurality of ADAS environmental sensors, to an available and suitable ECU for processing GPS data, such as a first ECU disposed within the EV and in a non-ADAS domain (e.g., a telematics domain) to generate a second output. The EE architecture can recognize that the GPS data does not have to be sent to an ADAS ECU for direct processing, and can be offloaded to another ECU to generate an intermediate output that can be used for ADAS operations. A domain connectivity switch of the EE architecture can then direct the second output (intermediate output) to an ADAS ECU for additional processing or use. Hence, a second ECU disposed within the EV and in the domain for ADAS can combine the second output with other data or outputs to perform an ADAS operation.

The ADAS domain(s) for performing ADAS operations can include a GPS subdomain, an IMU subdomain, a camera subdomain, a radar subdomain, a LIDAR subdomain, an ultrasonic subdomain, a vehicle-to-everything (V2X) sensor subdomain, a vehicle-to-vehicle (V2V) sensor subdomain, a vehicle-to-infrastructure (V2I) sensor subdomain, a vehicle-to-device (V2D) sensor subdomain, and a vehicle-to-passenger (V2D) sensor subdomain among others. The one or more ADAS domains can include ECUs (each sometimes referred to as an ECU of an ADAS domain) such as the ADAS ECU 135 or one of the sensor fusion modules 170A-N. Each ADAS subdomain can support or be associated with a corresponding environment sensor 150A-N and the environment sensor connectivity interface 110A. The GPS subdomain can include or support one of the sensor fusion modules 170A-N of the ADAS ECU 135 and the GPS unit 150A. The IMU subdomain can include or support one of the sensor fusion modules 170A-N of the ADAS ECU 135 and the IMU unit 150B. The camera domain can include or support one of the sensor fusion modules 170A-N of the ADAS ECU 135 and the camera 150C. The radar domain can include or support one of the sensor fusion modules 170A-N of the ADAS ECU 135 and the radar unit 150D. The LIDAR domain can include or support one of the sensor fusion modules 170A-N of the ADAS ECU 135 and the LIDAR unit 150E. The ultrasonic domain can include or support one of the sensor fusion modules 170A-N of the ADAS ECU 135 and the ultrasonic unit 150F. The V2X sensor domain can include or support one of the sensor fusion modules 170A-N of the ADAS ECU 135 and the V2X sensor 150G. The vehicle-to-vehicle (V2V) sensor domain can include or support one of the sensor fusion modules 170A-N of the ADAS ECU 135 and the V2X sensor 150G. The vehicle-to-infrastructure (V2I) sensor domain can include or support one of the sensor fusion modules 170A-N of the ADAS ECU 135 and the V2X sensor 150G. The vehicle-to-device (V2D) sensor domain can include or support one of the sensor fusion modules 170A-N of the ADAS ECU 135 and the V2X sensor 150G. The vehicle-to-passenger (V2D) sensor can include or support one of the sensor fusion modules 170A-N of the ADAS ECU 135 and the V2X sensor 150G.

The non-ADAS domains (or non-ADAS ECU domains) for performing non-ADAS operations can include a telematics domain, an infotainment domain, a passenger comfort domain, a passive comfort domain, a security domain, a chassis domain, a powertrain domain, or a battery management domain, among others. A telematics domain can include an embedded system of one or more ECUs or devices (sometimes referred as telematics control units) that controls tracking of the vehicle, and can include at least one of a GPS unit, and external interface for mobile communication which provides the tracked values to a centralized geographical information system (GIS) database server, an electronic processing unit, a microcontroller, a mobile communication unit, or memory (e.g., for storing GPS values or vehicle sensor data). The infotainment domain can include a center information display domain, an instrument cluster display domain, a steering wheel display domain, a heads up display domain, a rear controls domain, or a rear entertainment domain, among others.

Each non-ADAS domain can include one of the telematics ECUs 115A-N, the vehicle systems ECUs 125, or the infotainment ECUs 140, among others. A non-ADAS domain can refer to any domain that is not an ADAS domain as described above. A non-ADAS domain can support automotive functionalities such as telematics, infotainment, etc., that does not relate to ADAS operations. Non-ADAS ECUs can include the telematics ECUs 115A-N, the vehicle system ECUs 125, or the infotainment ECUs 140. Each non-ADAS domain can also include the one or more vehicle sensors 155A-N, and the vehicle sensor interconnectivity interface 110B, and the HMI display 145 including the central information display 180, the instrument cluster display 182, the steering wheel display 184, the heads up display 186, the rear control display 188, and the rear entertainment unit 188, among others. The telematics domain can include one of the telematics ECUs 115A-N and at least one of the vehicle sensors 155A-N. The infotainment domain can include one of the ECUs 175A-N or SOCs of the set of infotainment ECUs 140 and a corresponding one of the HMI displays 145. The passenger comfort domain can include the passenger comfort ECU 195A. The passive protection domain can include the passive protection ECU 195B. The security domain can include the security ECU 195C. The chassis domain can include the chassis ECU 195D. The powertrain domain can include the powertrain ECU 195E. The battery management domain can include the battery management ECU 195F.

Figure 2:
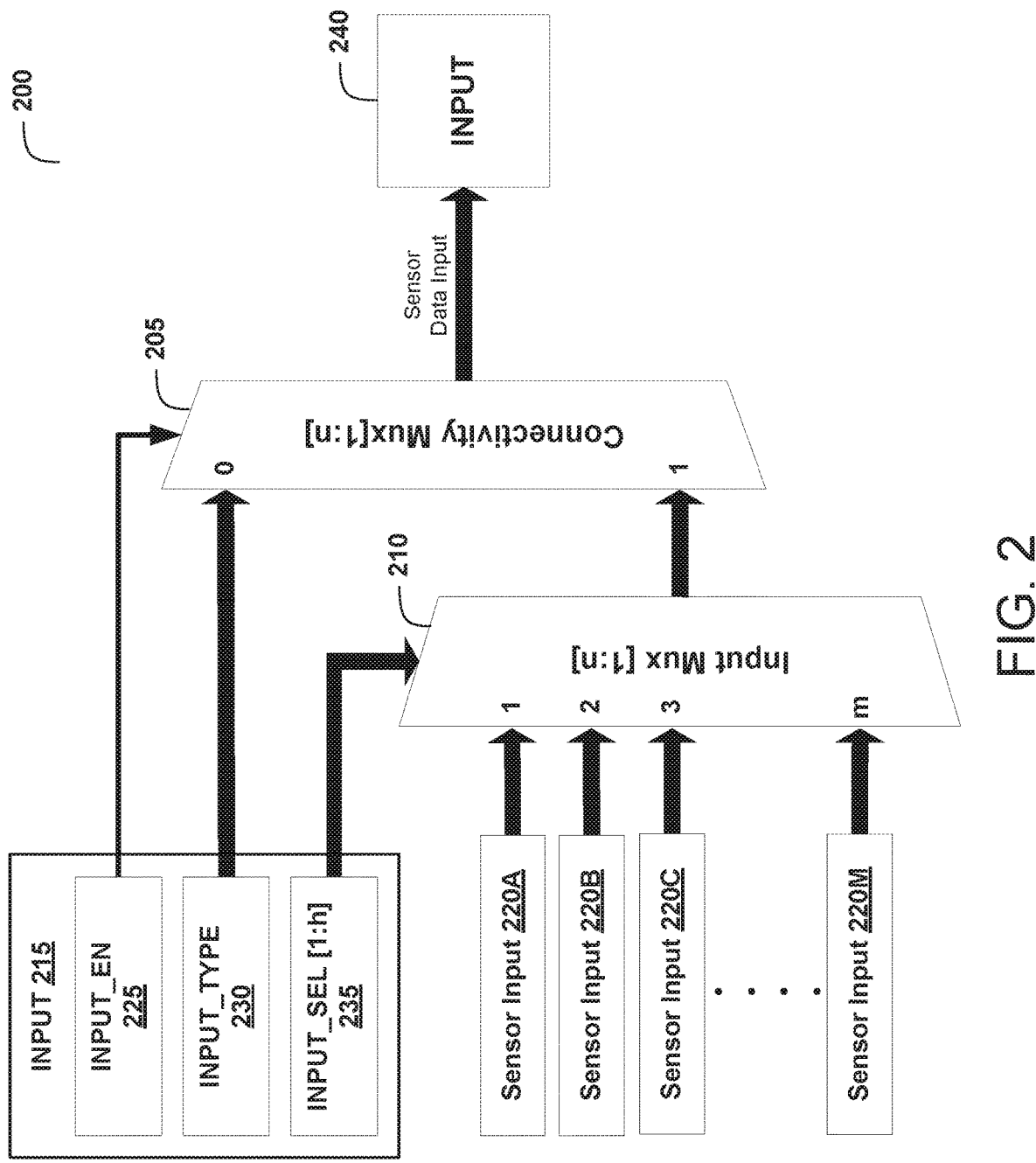
FIG. 2 is a block diagram depicting an example scalable sensor connectivity input channel.

FIG. 2 depicts an example scalable sensor input channel 200. The scalable sensor input channel 200 can correspond to, be part of, or used to implement the environment sensor connectivity interface 110A, the vehicle sensor connectivity interface 110B, and the sensor fusion modules 170A-N. The scalable sensor input channel 200 can include a connectivity multiplexer 205, an input multiplexer 210, a set of control inputs 215, one or more sensor inputs 220A-M, and an input 240. The connectivity multiplexer 205 and the input multiplexer 210 can be implemented using hardware (e.g., a logic circuit) or a combination of hardware. The connectivity multiplexer 205 and the input multiplexer 210 can also function as de-multiplexers. Each sensor input 220A-M can correspond to an input from one of the sensors, such as the set of environment sensors 115A or the set of vehicle sensors 115B. The set of control inputs 215 can include an input encoding 225, an input type 230, and a set of input selections 235. In general, the scalable sensor input channel 200 can define the sensor inputs 220A-M and can allow for scaling from 1 to m inputs.

The input multiplexer 210 can have a set of inputs connected to the sensor inputs 220A-M, a set of select lines connected to the corresponding set of input selections 235, and an output fed to the connectivity multiplexer 220. The input multiplexer 210 can have m input lines. To control the output of the input multiplexer 210, the set of input selections 235 can be fed into the select lines. The set of input selections 235 can have h bits, with $m=2^h$. The output of the input multiplexer 210 can be fed to one of the inputs of the connectivity multiplexer 205 (e.g., "1" input line as illustrated).

The connectivity multiplexer 210 can have two inputs, a select line, and an output line. The two inputs of the connectivity multiplexer 210 can include the input type 230 and the output of the input multiplexer 205. The select line to choose the output of the connectivity multiplexer 205 can include the input encoding 225. The output of the connectivity multiplexer 205 can be connected to the input 240. The input 240 in turn can be connected to the bus 192 of the scalable EE architecture 100. The input type 230 can specify a type of the sensor input 220A-M. The input enable (input_en) 225 can control whether the multiplexer 205 is enabled or not (e.g., whether to pass data from input type 230 or the input multiplexor 210) to the input 240. The output of the connectivity multiplexer 205 can be the sensor data input to the other components (e.g., ECUs) of the scalable EE architecture 100, and can be communicated via the bus 192. In this manner, the scalable input channel 200 (used to implement the environment sensor connectivity interface 110A, the vehicle sensor connectivity interface 110B, or the sensor fusion modules 170A-N) can be scaled or modified in accordance to a number of different input interface types or a number of sensor inputs.

Referring back to FIG. 1, among others, each environmental sensor 150A-N can generate an output to be handled, routed or processed by the environment sensor connectivity interface 110A. The environmental sensors can include a global positioning system (GPS) sensor, an inertial measurement unit (IMU) sensor, a Radar device or a camera, for example. A sensor of a plurality of vehicle sensors 105B (e.g., external/cabin/engine temperature sensors, rain sensors) can additionally or alternatively produce the output. Each sensor can detect, monitor or collect any characteristic or change in relation to any interior, positioning, motion-related or operational aspect of a vehicle, or to the vehicle's environment, and produce a corresponding output. For instance, the sensor can collect raw data from the vehicle's environment that is within the range or domain of the sensor, and can output the data in a specific format.

The generated output can be from the GPS unit 150A, the IMU 150B, the camera 150C, the Radar unit 150D, the LIDAR unit 150E, the ultrasonic unit 150F, and the V2X sensor 150G (e.g., the V2V sensor, the V2I sensor, the V2D sensor, the V2P sensor). The output can include a data in accordance with any of the interface protocols supported by the scalable EE architecture 100. The environment sensor connectivity interface 110A (also referred to a sensor connectivity switch) can direct, forward, or otherwise send the output to an ECU in a non-ADAS domain. The output can be sent by the environment sensor connectivity interface 110A via the bus 192 to one of the non-ADAS ECUs, such as the telematics ECUs 116A-N, the infotainment ECUs 140, or the vehicle system ECUs 125, among others.

In selecting which ECU to send the output, the environment sensor connectivity interface 110A can determine or calculate resources of a specific type available in the ECUs of the ADAS domains for processing the output from the environmental sensors 105A. The environment sensor connectivity interface 110A can determine or calculate resources of a specific type available in the ECUs of the non-ADAS domains for processing the output from the environmental sensors 105A. The resources at each ECU can include specific capabilities (e.g., to perform certain types of processing, achieve a certain level of accuracy, or process certain types of instructions), specific software functionality, computing processor type/availability/speed/capacity, memory type/usage/speed/capacity/availability, response time, response time predictability, latency, latency predictability, power consumption/availability, bandwidth consumption/availability, or network throughput, among others. The environment sensor connectivity interface 110A can identify the resources available at each ECU by accessing a list of predetermined system configuration for the corresponding ECU. The environment sensor connectivity interface 110A can also estimate the resources available at each ECU by querying, measuring or receiving updates from the respective ECU. Based on the resources available at each ECU of the ADAS domain and the non-ADAS domain, the environment sensor connectivity interface 110A can select one of the ECUs in the non-ADAS or ADAS domain(s) to direct the output. The environment sensor connectivity interface 110A can send the output to a selected ADAS ECU instead of the non-ADAS ECU based on the resources available at each ECU. The environment sensor connectivity interface 110A can send the output to a selected non-ADAS ECU instead of the ADAS ECU based on the resources available at each ECU.

In selecting which ECU to send the output, the environment sensor connectivity interface 110A can also determine a priority consideration (or priority level) for processing the output from the environmental sensors 105A. The priority consideration can include a service/urgency/criticality/comfort requirement or level specified for an automotive operation (e.g., an ADAS operation, a powertrain operation, a malfunction alert operation). The priority consideration can specify an order in which ECUs are to process the output of the environmental sensor 105A. For example, the priority consideration can specify that outputs from the ultrasonic sensor 150F are to be processed by the passive protection ECU 195B first prior to any other ECU. To determine the priority consideration, the environment sensor connectivity interface 110A can identify a type of sensor corresponding to a source of the output. The environment sensor connectivity interface 110A can determine which priority level to assign (or is assigned) to particular sensor data at a particular time, or relating to a certain event/trigger/condition, or for a certain automotive function, for instance.

The type of sensor can correspond to one of the environment sensors 105A for instance. Using the identification of the type of sensor corresponding to the source of the output, the environment sensor connectivity interface 110A can access a priority schedule to identify or determine the priority consideration for the type of sensor. The priority schedule can define, determine or specify the priority consideration for each ECU, for instance according to the type of sensor identified as the source of the output. The priority consideration can be a numerical value indicating a precedence score for the ECU, e.g., according to the type of sensor, for a particular time, relating to a certain event/trigger/condition, or for a certain automotive function. Based on the resources available at each ECU together with the corresponding priority consideration, the environment sensor connectivity interface 110A can select one of the ECUs in a non-ADAS or ADAS domain to direct the output. In certain cases, an ECU of the ADAS domain (or a non-ADAS domain) can be more suitable or is the only option for processing certain types of sensor data or for generating certain types of output.

Responsive to the selection, the environment sensor connectivity interface 110A can send the output of the environment sensor(s) 150A to the selected ADAS ECU. The recipient ADAS ECU can use the output to carry out one or more ADAS operations (or non-ADAS operations in certain cases). The one or more ADAS operations can include electronic stability control, activation of anti-lock brakes, signaling alert, adaptive cruise control, traction control, collision avoidance measures, and adaptive light control among others. The environment sensor connectivity interface 110A can also provide or send instructions to the selected ECU to process the output to perform or initiate the one or more ADAS operations. The instructions can specify one or more transformations of the output from the environmental sensor 105A for processing by the ADAS ECU. Using the instructions, the recipient ADAS ECU can process the output received from the environmental sensor connectivity interface 110A. By processing the output, the recipient ADAS ECU can perform the one or more ADAS operations based on the output received from the environment sensor connectivity interface 110A. The ADAS ECU can also generate instructions to perform the one or more ADAS operations based on the output received from one of the environment sensors 105A via the environment sensor connectivity interface 110A. The ADAS ECU can relay, forward, or send the instructions to one or more ADAS devices connected to the ADAS ECU to perform the one or more ADAS operations as specified by the instructions.

Responsive to the selection, the environment sensor connectivity interface 110A can send the output of the environment sensor(s) 105A to the selected non-ADAS ECU. In response to the receipt of the output from the environment connectivity interface 110A, the recipient non-ADAS ECU can generate a new output based on the received input. The environment sensor connectivity interface 110A can also provide or send instructions to the selected ECU to process the output to generate a new output. The instructions can specify one or more transformations of the output from the environmental sensor 105A for compatible processing by the selected non-ADAS ECU. The environment sensor connectivity interface 110A can select which instructions to send to the non-ADAS ECU based on the type of the non-ADAS ECU. Using the instructions, the recipient non-ADAS ECU can process the output received from the environmental sensor connectivity interface 110A. By processing the output, the non-ADAS ECU can generate a new output based on the output received from the environment sensor connectivity interface 110A. Subsequent to generating the new output, the non-ADAS ECU can send the new output to one of the ADAS ECUs. The non-ADAS ECU can select one of the ADAS ECUs to which to send the newly generated output. The non-ADAS ECU can select the ADAS ECU based on the instructions received from the environment sensor connectivity interface 110A. The instructions can also specify which (or which type of) ADAS ECU to send the newly generated output. Based on the selection, the non-ADAS ECU can send the newly generated output to the ADAS ECU.

The domain connectivity distribution module 130 can direct, route, or send the output from the non-ADAS ECU to the selected ADAS ECU. The domain connectivity distribution module 130 can send the output generated by the non-ADAS ECU to the selected ADAS ECU via the bus 192. The generated output can be in the form of a data frame (or other information package or communications construct) for handling, routing or processing by the domain connectivity distribution module 130. In some implementations, the domain connectivity distribution module 130 can insert or format the output into a data frame (or other information package or communications construct) in accordance with one of the supported interface protocol for instance. The data frame can specify a source corresponding to the sensor or non-ADAS ECU that resulted or yielded the output. The data frame can specify a destination corresponding to the selected ADAS ECU. The domain connectivity distribution module 130 can direct/route/transmit the data frame (e.g., according to information specified or included in the data frame or output) to a suitable domain or ECU for further processing or use. Additional details regarding the functionality of the domain connectivity distribution module 130 are provided below.

The ADAS ECU can subsequently receive the output generated by the non-ADAS ECU using the output of one of the environmental sensors 105A. The ADAS ECU can parse the data frame to extract or identify the data generated by the non-ADAS ECU. The ADAS ECU can use the output generated by the non-ADAS ECU to perform or initiate the one or more ADAS operations. In addition to the output generated by the non-ADAS ECU, the ADAS ECU can also receive the output(s) from one of the environmental sensors 105A or from another ADAS ECU. The ADAS ECU can combine the output from one of the environmental sensors 105A and the output(s) generated by the non-ADAS ECU or another ADAS ECU. The ADAS ECU can also use the output from the one of the environmental sensors 105A or the output(s) generated by the non-ADAS ECU or another ADAS ECU to perform the one or more ADAS operations. The environment sensor connectivity interface 110A can also provide or send instructions to the selected ECU to process the output(s) to carry out the one or more ADAS operations. The instructions can specify one or more transformations of the output from the environmental sensor 105A or of the output(s) from the non-ADAS ECU or another ADAS ECU for the ADAS ECU. Using the instructions, the ADAS ECU can process the output received from the environmental sensor connectivity interface 110A. By processing the output, the recipient ADAS ECU can perform the one or more ADAS operations based on the output(s) generated by the non-ADAS ECU or another ADAS ECU. By processing the output, the recipient ADAS ECU can perform the one or more ADAS operations based on the combination of the output received from the environment sensor connectivity interface 110A and the output(s) from the non-ADAS ECU or another ADAS ECU. The ADAS ECU can also generate instructions to perform the one or more ADAS operations based on the output received from one of the environment sensors 105A and the output(s) from the non-ADAS ECU. The ADAS ECU can relay, forward, or send the instructions to one or more ADAS devices connected to the ADAS ECU to perform the one or more ADAS operations as specified by the instructions.

The environmental sensor connectivity interface 110A, the domain connectivity distribution module 130, or the one or more gateways can interact or communicate to coordinate the distribution and processing of sensor outputs and intermediate results across various domains and ECUs, to obtain an output for use in a certain ADAS (or other automotive) operation or function. For instance, one of the environmental sensor connectivity interface 110A, the domain connectivity distribution module 130, or the one or more gateways can control or manage the distribution and processing of at least some of the sensor outputs and intermediate results. Moreover, portions of the description herein referencing the environmental sensor connectivity interface 110A and environmental sensors 105 can similarly apply to the vehicle sensor connectivity interface 110B and the vehicle sensors 105B. For instance, sensor data from a vehicle sensor 105B can be directed by the vehicle sensor connectivity interface 110B to any suitable domain and ECU for processing or intermediate processing. The vehicle sensor connectivity interface 110B can similarly interact or communicate with the environmental sensor connectivity interface 110A, the domain connectivity distribution module 130, or the one or more gateways, to coordinate the distribution and processing of sensor outputs and intermediate results across various domains and ECUs, to obtain an output for use in a certain ADAS (or other automotive) operation or function.

In addition, the domain connectivity distribution module 130 can function as a scalable multi-protocol interface distribution matrix for both a central gateway architecture and a backbone gateway architecture. Through scaling configuration, the domain connectivity distribution module 130 can route or handle network communications of various domains for the central gateway network architecture. The domain connectivity distribution module 130 can also route or handle network communications for backbone gateway architecture. Protocols supported by the domain connectivity distribution module 130 can include: the Peripheral Sensor Interface (PSIS) protocol scaling from 1 to 1n, Distributed Systems Interface (DSI) protocol scaling from 1 to 2n, Single Edge Nibble Transmission (SENT) interface protocol scaling from 1 to 3n, Controller Area Network with Flexible Data-Rate (CAN FD) interface protocol scaling from 1 to 4n, Serial Peripheral Interface (SPI) bus interface protocol scaling from 1 to 5n, Local Interconnect Network (LIN) interface protocol scaling from 1 to 1 m, CAN interface protocol scaling from 1 to 2 m, FlexRay interface protocol scaling from 1 to 3 m, a Media Oriented Systems Transport (MOST) interface protocol scaling from 1 to 4 m, and Ethernet interface protocol scaling from 1 to 5 m, among others.

The CAN system protocol bus can be a robust vehicle system interface standard designed to allow microcontroller units (MCU) and other computing devices to communicate with none another in settings with a central processing unit or a host computer. The CAN system bus protocol can be a message-based protocol for multiplex electrical writing used in automotive applications. A Carrier Sense Media Access/Collision Resolution (CSMA/CR) technique can be used to resolve access conflicts on the bus 192, when two components attempt to send data frames simultaneously. The CAN protocol can also be a multi-master serial bus interface standard for connecting ECUs together. Multiple network nodes can be on the network to communicate using the CAN protocol. The complexity of the node can range from an I/O device (e.g., a sensor component) to an embedded computing system (e.g., ADAS ECUs 135), with a CAN interface and integrated system firmware and software. Under the CAN system protocol, data transmission can use a lossless bitwise arbitration to resolve contentions. The data transmission can be transmitted without a clock signal in an asynchronous format. The arbitration can include all the network nodes to synchronize to a sample for every bit in the network at the same time. The CAN bus can have four types of frames: a data frame containing node data for transmission, a remote frame for requesting transmission of another data frame with a specific identifier, an overload frame for injecting a delay between another data frame and another remote frame, and an error frame for indicating error by the transmitting network mode. The CAN protocol can be well-suited for body-control applications, because of low cost and high reliability. CAN, however, can lack bandwidth to process video and audio data, as the supported data rate can be limited at 1 megabit per second.

The CAN FD protocol can be an extension of the previously described CAN interface protocol. CAN FD can accommodate an increased number of ECUSs and the associated bandwidth requirements of such EE architectures 100. The CAN FD protocol can also minimize delays between an instruction and a transfer of data or latency to increase the network signal bandwidth. The CAN FD can further allow for more data storage capacity in each data frame. While the original CAN bus protocol can hold up to 8 bytes of data per frame, under the CAN FD a data frame can hold up to 64 bytes, thereby increasing the data rate to 15 megabits per second.

The LIN protocol can be a serial network interface protocol for communications between various electronic components in automotive settings. The LIN interface specified can allow for low-cost hardware nodes to be used as a single wired network. In EV environments, MCUs with universal asynchronous receive-transmitter (UART) functionalities or dedicated LIN circuitry can be used. In such implementations, the MCUs connected to the EE architecture network via a LIN transceiver can generate LIN data in accordance with the protocol. Transmission data within the LIN system bus can be serially transmitted as an eight-bit data byte with one start bit one stop bit, without parity bits as the break field can lack a start bit and a stop bit. Under this protocol, the bit rates can vary between 1 kilobit per second to 20 kilobits per second. The smallest amount of time expected by the LIN masters clock source can be 52 µs at 19.2 kilobits per second. There can be two bus states: sleep mode and active mode. While the data is on the bus 192, all LIN nodes can be requested to be in an active state. After a specified time out, the nodes can enter the sleep mode and can be released back into the active state by a wakeup time frame. The wakeup frame can be sent by any node requesting activity on the bus, in accordance with the LIN master node following an internal schedule or one of the attached LIN slave nodes activated by an internal trigger. After the nodes are awakened, the LIN master node can continue to schedule the next identifier.

The PSIS protocol can be a two-wire interface protocol for connecting peripheral sensors to ECUs in automotive settings. Both point-to-point and bus configurations with asynchronous and synchronous data transmissions can be supported with data rates up to 125 kilobits per second. The DSI protocol can be a bus protocol to interconnect multiple remote sensors and actuators to a central control module. The data rate under the DSI protocol can range up to 200 kilobits per second. The SENT protocol can be a point-to-point scheme for transmitting signal values from sensors to a controller. The objective of the SENT protocol can be to allow for high-resolution data transmission with a lower system cost than available serial data solution. The data rates under the SENT protocol can range up to 370 kilobits per second.

The FlexRay interface protocol can be fast and redundant for fault-tolerant systems. Under the FlexRay protocol, there can be two physical layer transceivers for connecting communication controller to two channels of twisted pair wires for redundancy. The three data rates used can include 2.5 megabits per second, 5 megabits per second, and 10 megabits per second. The protocol can support both "star" and "party line" bus interface topologies, and can have two independent data channels for fault tolerance. In this manner, communication in one channel can continue with reduced bandwidth, if the other channel becomes inoperative. The system bus can operate on a time cycle divided into two segments, a static segment and a dynamic segment. The static segment can be pre-allocated into slices for individual types of communications, thereby providing a stronger real-time guarantee relative to the CAN protocol. The dynamic segment can operate more similarly to the CAN protocol, with network nodes controlling the bus based on availability and event-triggers. The FlexRay system can include a bus, processors, or ECUs. Each ECU can have an independent clock. The clock can be sent in the static segment. The bus can have lower operating voltage levels and asymmetric in the edges, leading to an extension in length of communication.

The MOST protocol can be an interface protocol for a high-speed multimedia network. Under the MOST protocol, a serial bus can use a single interconnect, a daisy-chain topology, or a ring topology for synchronous communication to transport audio, video, control signals, and other data. The MOST protocol can support data rates of 25 megabits per second, 50 megabits per second, and 150 megabits per second. The MOST specification can define all seven layers of the Open Systems Interconnection (OSI) model for data communication, including the physical layer and the data link layer. Standardized interfaces can simply integration in multimedia devices for the MOST protocol. In this manner, the interfaces can provide the backbone architecture to the EE architecture to network a variety of multimedia interfaces. The MOST protocol can also provide an application programming interface (API) to access device and EE architecture functionality. The communication functionality can be provided by a drive software referred to as MOST Network Services. The Network Services can include Basic Layer System Services (Layer 3, 4, 5) and Application Socket Services (Layer 6), and can process the MOST protocol between a MOST Network Interface Controller (NIC) on the physical layer and the API (Layer 7).

The SPI protocol can be a synchronous serial communication interface specification for short-distance communications in embedded systems. The SPI devices can communicate in full duplex mode using a master-slave architecture with a single master. The master device can originate a data frame for reading and writing. Multiple slave devices can be supported through a selection of individual slave select lines. SPI can be a referred to as a four-wire serial bus, contrasting with one-wire, two-wire, three-wire serial buses. The SPI can be a synchronous serial interface but can differ from the Synchronous Serial Interface (SSI) protocol. The SSI protocol can also be a four-wire synchronous serial communication protocol, but can employ differential signaling and can provide only a single simplex communication channel.

Ethernet protocol can be for high-speed interfaces used in network communications including automotive settings (e.g., in the EE architecture network). In vehicular environments, Ethernet can be used to transport a variety of high-speed data, thereby increasing the signal bandwidth. Similar to the CAN bus protocol, the Ethernet protocol can be a packetized system, in which information can be transferred in packets among nodes within the network. In addition, Ethernet protocol can be bidirectional, and speed possible on any individual link can decrease as the number of nodes increases. Ethernet can be a full duplex and can transport data with speeds over a hundred times faster than the CAN bus. Ethernet used for certain mid-bandwidth network communications (e.g., navigation, infotainment, and ADAS systems, etc.) can operate akin to a CAN bus while providing much more bandwidth. Under the Ethernet protocol, data rates can exceed 100 megabits per second. Ethernet can also be used as a diagnostic interface. The hardware for such applications can be inexpensive with a wide range of software applications available. The Ethernet interface can involve the use of an embedded processor running on a Transmission Control Protocol (TCP) or Internet Protocol (IP) stack and a memory unit to store program code. Additional memory can be used as a temporary data storage from communication networks.

Figure 3:
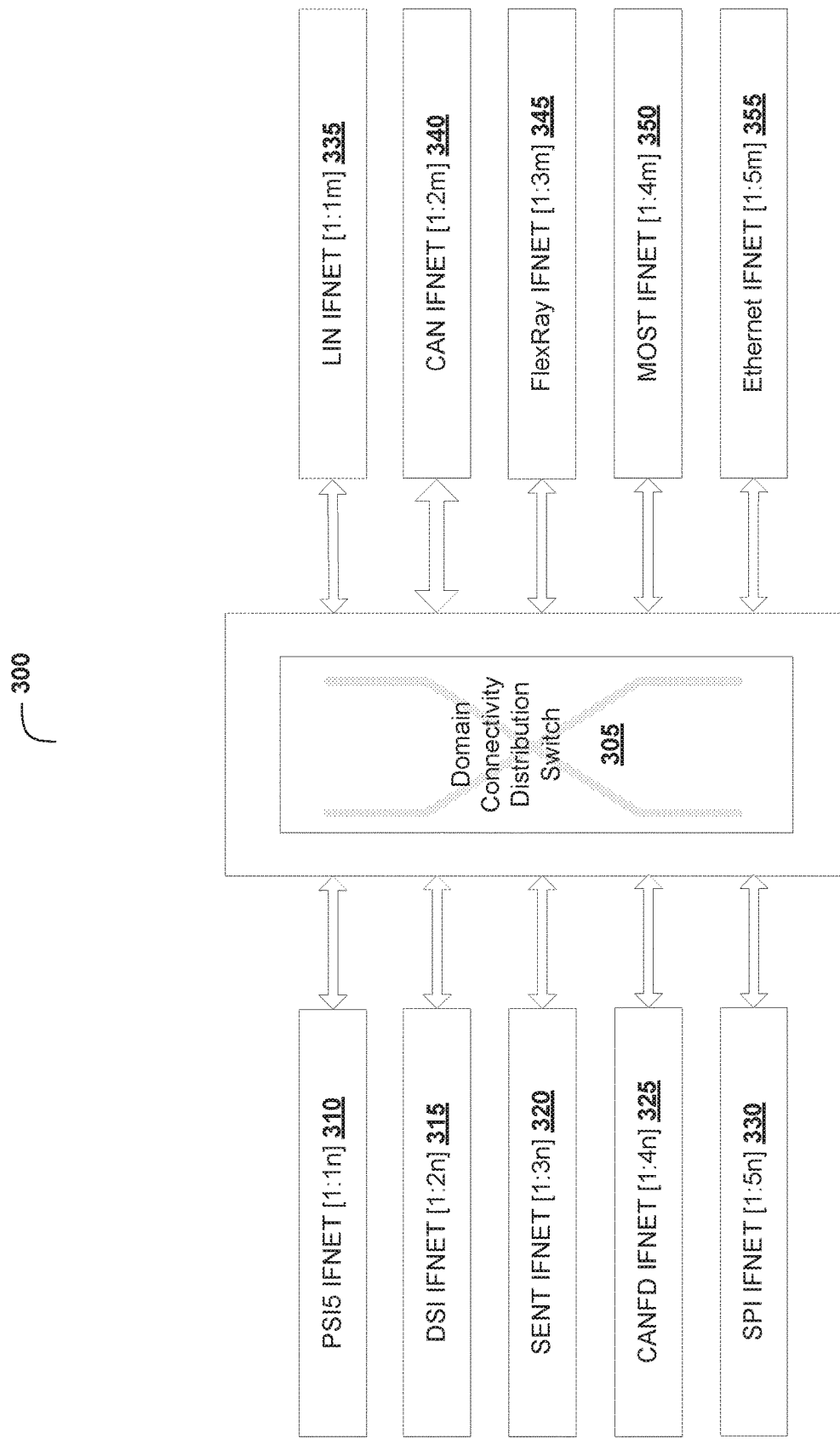
FIG. 3 is a block diagram depicting an example scalable connectivity domain distribution switch.

FIG. 3 depicts an environment 300 for a scalable domain connectivity distribution switch 305. The environment 300 and the scalable domain connectivity distribution switch 305 can be used to implement the domain connectivity distribution module 130 of the scalable EE architecture 100. The scalable domain connectivity distribution switch 305 can support various interface protocols in communicating with other components in the EV environment, such as: the Peripheral Sensor Interface (PSIS) protocol scaling from 1 to 1n, Distributed Systems Interface (DSI) protocol scaling from 1 to 2n, Single Edge Nibble Transmission (SENT) interface protocol scaling from 1 to 3n, Controller Area Network with Flexible Data-Rate (CAN FD) interface protocol scaling from 1 to 4n, Serial Peripheral Interface (SPI) bus interface protocol scaling from 1 to 5n, Local Interconnect Network (LIN) interface protocol scaling from 1 to 1 m, CAN interface protocol scaling from 1 to 2 m, FlexRay interface protocol scaling from 1 to 3 m, a Media Oriented Systems Transport (MOST) interface protocol scaling from 1 to 4 m, and Ethernet interface protocol scaling from 1 to 5 m. Accordingly, outputs or intermediate outputs from any domain(s) can be routed, translated, normalized or otherwise processed by the domain connectivity distribution module 130, and sent to an appropriate destination or domain for use or processing.

Referring back to FIG. 1, the in-vehicle infotainment ECUs 140 can include a scalable ECUs (e.g., ECUs 175A-N) or system on a chip (SOC) platform to support the HMI displays 145, such as the center information display 180, the instrument cluster display 182, the steering wheel display 184, the head up display 186, the rear controls display 188, and the rear entertainment unit 190, among others. The redundant display ECUs can be implemented through scalable infotainment ECU 175A-N configurations for redundancy fail-safe or fault-tolerant display control purposes. For example, when a main ECU or SOC for the center information display 180, instrument cluster display 182, or the steering wheel display 184 has failed, a backup ECU can be configured to power such display through the domain connectivity distribution module 130, thereby facilitating fail-safe protection.

Figure 4A:
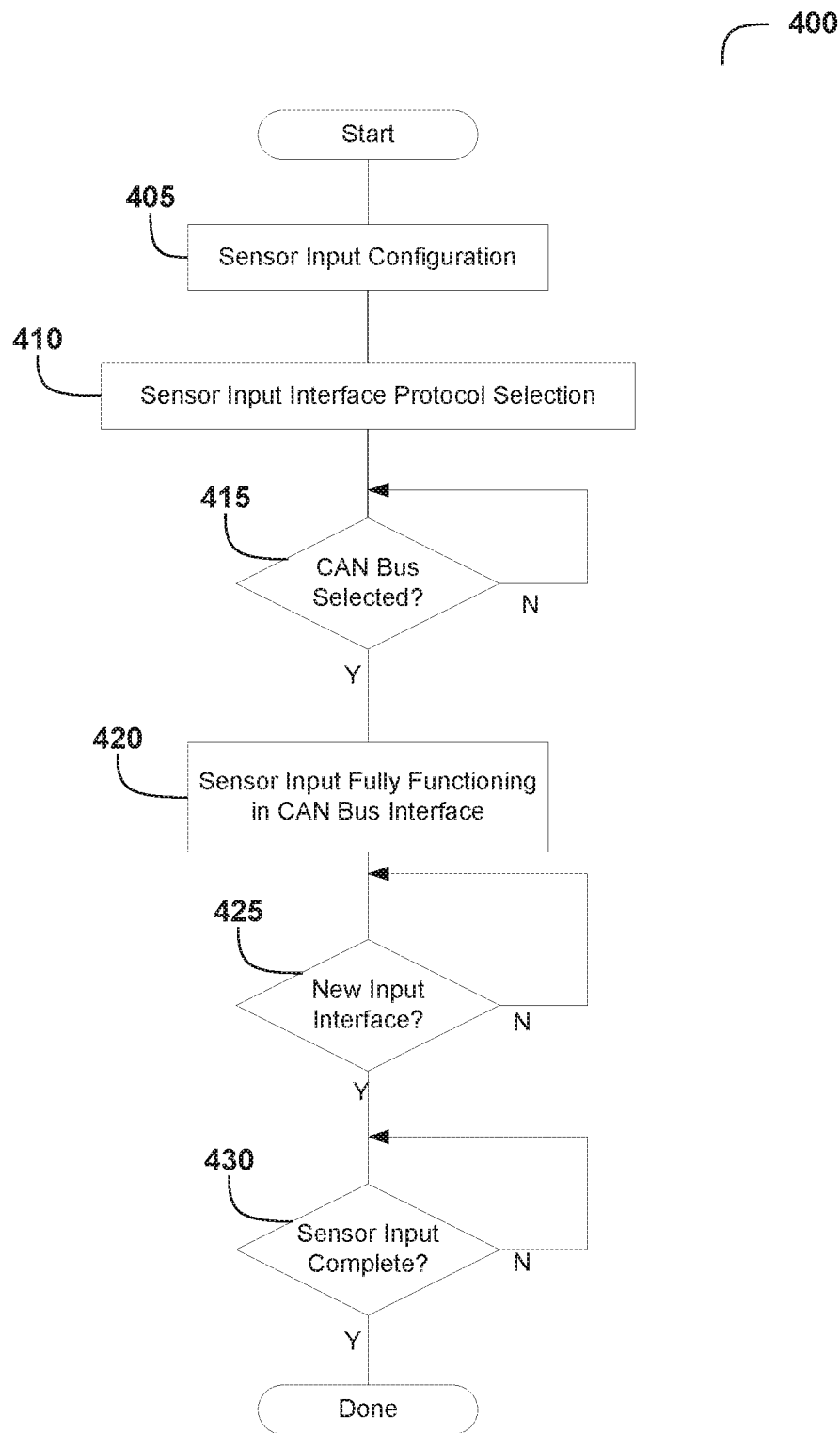
FIG. 4A is a flow diagram depicting an example method of operating electronic controller units (ECUs) across multiple ECU domains in an automotive configuration for scaled sensor connectivity input channel.

FIG. 4A depicts a method 400 of operating electronic controller units (ECUs) across multiple ECU domains in an automotive configuration for scaled sensor connectivity input channel. The functionalities of method 400 can be performed by the environmental connectivity interface 110A or the scaled sensor connectivity channel 200 as detailed above. The sensor connectivity switch can configure sensor input (405). The sensor connectivity switch can select a sensor input interface protocol (410). The sensor connectivity switch can determine whether the Connector Area Network (CAN) bus is selected (415). If the sensor connectivity switch determines that the CAN bus is not selected, the sensor connectivity switch can repeat the functionality of (415). If the sensor connectivity switch determines that the CAN bus is selected, the sensor connectivity switch can send the sensor input into the CAN bus interface (420). The sensor connectivity switch can determine whether a new input interface is active, e.g., has new or pending sensor data for processing (425). If the sensor connectivity switch determines that there is no new input interface that is active, the sensor connectivity switch can repeat the functionality of (425). Conversely, if the sensor connectivity switch determines that there is a new input interface that is active, the sensor connectivity switch can determine whether the associated sensor input/data is complete (430). If the sensor connectivity switch determines that the sensor input/data is not yet complete, the sensor connectivity switch can continue to send the sensor input/data onto the CAN bus. If the sensor connectivity switch determines that the sensor input/data is complete, the sensor connectivity switch can terminate and repeat the functionalities of method 400.

Figure 4B:
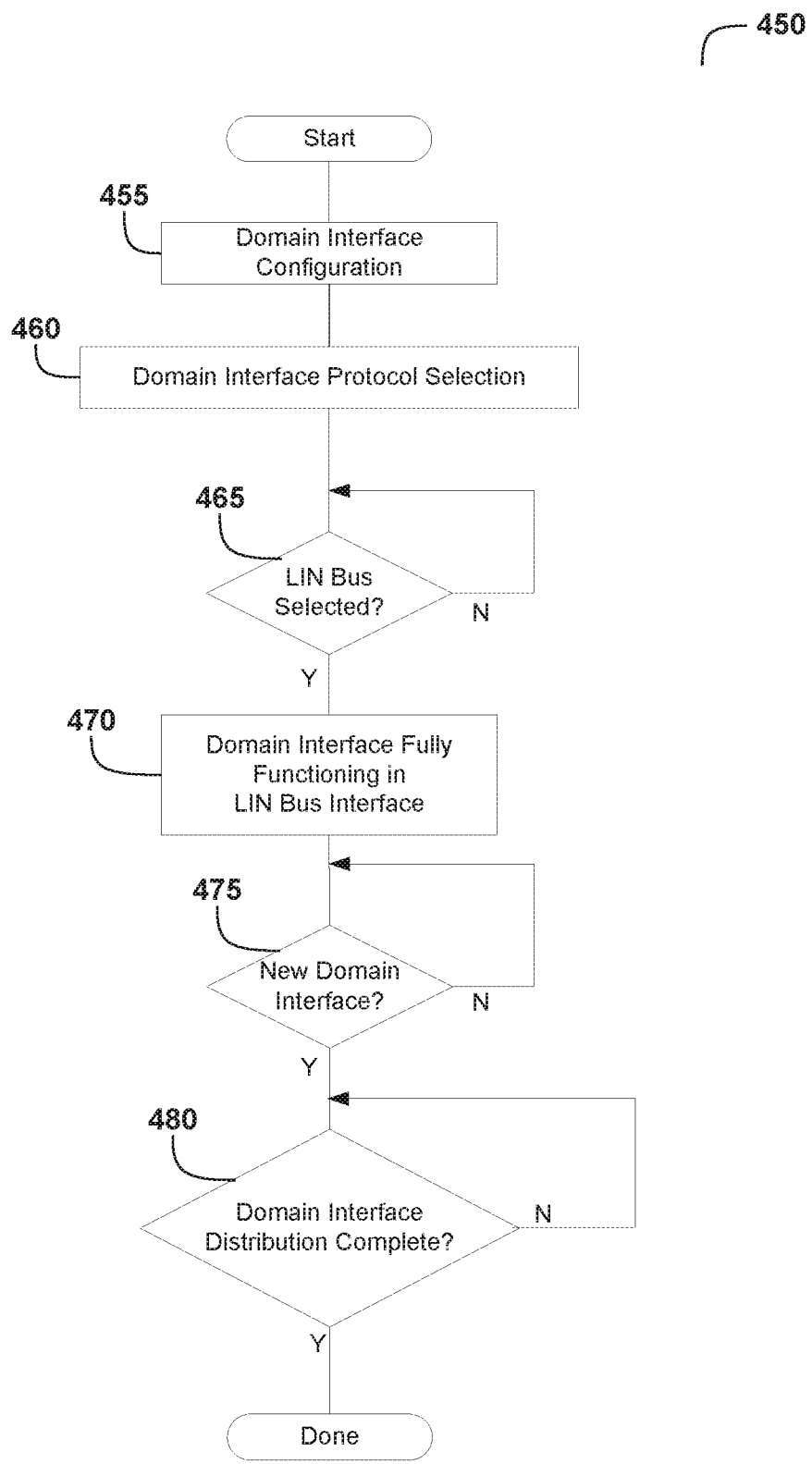
FIG. 4B is a flow diagram depicting an example method of operating electronic controller units (ECUs) across multiple ECU domains in an automotive configuration for a scalable connectivity domain distribution switch.

FIG. 4B depicts a method 450 of operating electronic controller units (ECUs) across multiple ECU domains in an automotive configuration for scaled sensor connectivity input channel. The functionalities of method 450 can be performed by the scalable domain connectivity distribution switch 305 as detailed above. The domain connectivity distribution switch can configure a domain interface (455). The domain connectivity distribution switch can select a domain interface protocol for the domain interface (460). The domain connectivity distribution switch can determine whether the Local Interconnect Network (LIN) bus is selected or available for communications (465). If the domain connectivity distribution switch determines that the LIN bus is not selected, the domain connectivity distribution switch can repeat the functionality of (465). If the domain connectivity distribution switch determines that the LIN bus is selected, the domain connectivity distribution switch can be fully functional in the LIN bus interface (470). The domain connectivity distribution switch can determine whether there is a new domain interface (475). If the domain connectivity distribution switch determines that there is no domain interface, the domain connectivity distribution switch can repeat the functionality of (475). Conversely, if the domain connectivity distribution switch determines that there is a new domain interface, the domain connectivity distribution switch can determine whether the domain interface distribution (e.g., processing and communication of domain/ECU output data through the domain connectivity distribution switch) is complete (480). If the sensor connectivity channel determines that the interface distribution is not yet completed, the domain connectivity distribution switch can continue interface distribution until this is complete. If the domain connectivity distribution switch determines that the interface distribution is complete, the domain connectivity distribution switch can terminate or repeat the functionalities of method 450.

Figure 5:
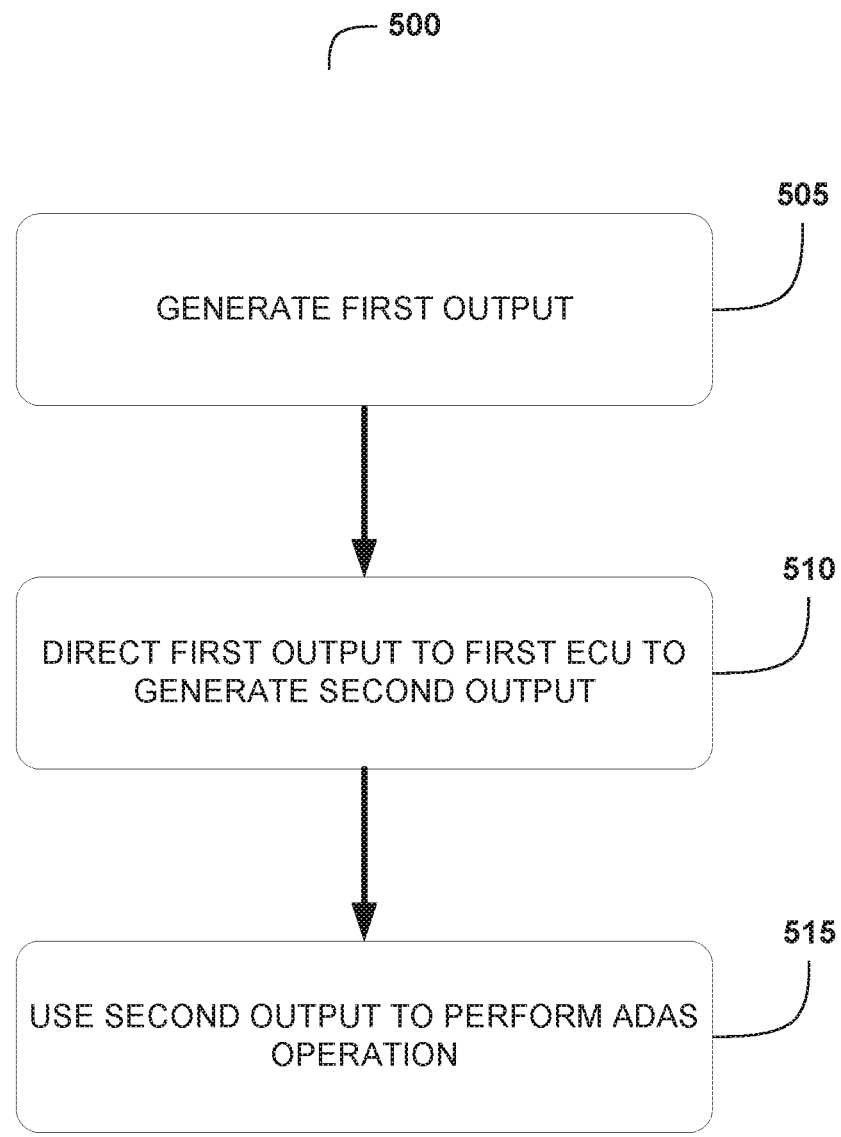
FIG. 5 is a flow diagram depicting an example method of operating electronic controller units (ECUs) across multiple ECU domains in an automotive configuration.

FIG. 5 depicts an example method 500 of operating electronic controller units (ECUs) across multiple ECU domains in an automotive configuration is depicted. The method 500 can include generating a first output (ACT 505). The method 500 can include directing first output to a first ECU to generate a second output (ACT 510). The method 500 can include using the second output to perform an ADAS operation (ACT 515).

The method 500 can include generating a first output. The method 500 can include generating, by a first sensor of a plurality of advanced driver-assistance system (ADAS) environmental sensors, a first output. The plurality of ADAS sensors can include a global positioning system (GPS) sensor, an inertial measurement unit (IMU) sensor, a Radar device or a camera, for example. A sensor of a plurality of vehicle sensors 105B (e.g., temperature, rain sensors) can additionally or alternatively produce the output. The sensor can detect, monitor or collect any characteristic or change in relation to any interior or operational aspect of a vehicle, or to the vehicle's environment, and produce a corresponding output. For instance, the sensor can collect raw data from the vehicle's environment that is within the range or domain of the sensor, and can output the data in a specific format.

The first output can for example include an output of at least one of the GPS sensor, the IMU sensor, the camera, a radio detection and ranging (radar) sensor, a light detection and ranging (LIDAR) sensor, an ultrasonic sensor, a vehicle to vehicle (V2V) sensor, a vehicle to infrastructure (V2I) sensor, a vehicle to device (V2D) sensor, and a vehicle to passenger (V2P) sensor. The first output can include data for use in an ADAS operation or function. The output of certain sensors can include data that is to undergo low level processing in certain ADAS operations or functions, for instance GPS or camera data. For example, functionality for processing GPS or camera data may be readily available in various type of ECUs (e.g., telematics ECUs used for wireless communications), and the processing of GPS or camera data, and the outputs thereof, can be considered standard, routine or otherwise readily available/accessible. Accordingly, processing of GPS or camera data can be considered to be low level processing in ADAS context for example. The output of certain sensors can include data considered to be high level data for use in certain ADAS operations or functions, for instance IMU or Radar data. IMU data can for instance include measurements of inertial data acquired by a gyroscopic detector or accelerometer, and can require specific or specialized ADAS processing to be useful, accurate or safe to use in an ADAS context. Accordingly, the method 500 can include directing specific sensor output(s) to particular domain(s) or ECU(s) for processing.

The method 500 can include directing first output to a first ECU to generate a second output. The method 500 can include directing, by a sensor connectivity switch, the first output to a first ECU in one of a plurality of non-ADAS domains to generate a second output. For instance, the sensor connectivity switch can select the first ECU from a non-ADAS domain to direct the first output, responsive to determining that the first output (e.g., GPS data) is to undergo low level processing in the context of an associated ADAS (or other automotive) operation.

The plurality of non-ADAS domains can include a telematics domain or an infotainment domain for example. The sensor connectivity switch can identify or determine that some of these domains are available or suitable for processing data in the first output. Each of the non-ADAS domains can include at least one ECU. As an example, the first ECU can comprise an ECU in a domain for at least one of telematics, infotainment, battery management, powertrain, chassis, body, passenger comfort, and security. The sensor connectivity switch can incorporate intelligence or programming (e.g., via artificial intelligence, machine learning or defined rules) to direct the first output to a suitable ECU or domain. The sensor connectivity switch can be instructed by another entity (e.g., a gateway of the EE architecture) to direct the first output to a suitable ECU or domain.

For example, the sensor connectivity switch can select (or be instructed to select) a particular domain or ECU to direct the output, according to one or more defined rules or policies. The rules or policies (and corresponding rule engine of the EE architecture network or sensor connectivity switch for instance) can consider factors or conditions such as the type of sensor output, whether the processing is considered low or high level processing in the ADAS or other context, the source of the sensor data, the amount of sensor output, the timing or context of the sensor data, any priority level or instructions assigned with the sensor data, any ADAS (or other automotive) operation that shall be using or relying on the sensor data or on processed output based on the sensor data, availability of suitable or required resources in the domains or ECUs, and so on. The sensor connectivity switch can select the first ECU (from a non-ADAS domain) instead of the second ECU in the domain for ADAS, to direct the first output.

For example, the sensor connectivity switch can perform the selection based on resources available in at least the first ECU and the second ECU to process the first output. The sensor connectivity switch can determine resources of a specific type available in at least one of ECUs in the domain for ADAS and ECUs in the plurality of non-ADAS domains to process the first output. The sensor connectivity switch can select the first ECU to direct the first output, based on the resources of a specific type available in at least one of the ECUs in the domain for ADAS and the ECUs in the plurality of non-ADAS domains to process the first output. The sensor connectivity switch can select the first ECU to direct the first output, based on the determination and at least one priority consideration to process the first output for an ADAS operation for instance. Based on the selection process (e.g., according to one or more rules or policies), the sensor connectivity switch can select the first ECU from among ECUs in the plurality of non-ADAS domains, for instance.

The sensor connectivity switch can further provide one or more instructions to the first ECU to process the first output to generate a second output. For example, the one or more instructions can be embedded in the sensor output or otherwise accompany/identify the sensor output. The instructions can be in the form of metadata in or accompanying the sensor data. The instructions can include instructing the recipient ECU on requirements or parameters for processing the sensor data, such as accuracy level, delivery timeframe for the processed results, a next/final destination for the processed results, a format for the processed results, identification of an associated ADAS or other automotive operation, identification/assignment of a priority level to the sensor data or processed results, and so on. The first ECU can update or incorporate some or all of the instructions to be sent with the second output. Similarly the instructions (e.g., in metadata form) can be embedded in the second output or otherwise accompany/identify the second output. The instructions can include instructing a recipient (e.g., the domain connectivity switch, or a recipient ECU) on requirements or parameters for using or processing the second output, such as accuracy level, delivery timeframe for the processed results, a next/final destination for the processed results, a format for the processed results, identification of an associated ADAS or other automotive operation, identification/assignment of a priority level to the second output or processed results, and so on.

The method 500 can include using the second output to perform an ADAS operation. The method 500 can include using, by a second ECU in a domain for ADAS, the second output to perform an ADAS operation. A domain connectivity switch can direct or route the second output from the first ECU to the second ECU in the domain for ADAS. For example, the domain connectivity switch can direct or route the second output, or select the second ECU, according to instructions that accompany the second output. In some cases, the sensor connectivity switch can direct a third output of a second sensor (e.g., IMU data) of the plurality of environmental sensors, to the second ECU in the ADAS domain. For example, the sensor connectivity switch can identify or determine that the third output comprises data that is to undergo high level processing in an ADAS context. Responsive to the identification/determination, the sensor connectivity switch can select the second ECU in the ADAS domain to process the third output, and direct the third output to the second ECU. The second ECU can use the second output and the third output to perform the ADAS operation. For instance, the second ECU can combine or otherwise use information from the second output (e.g., from a result of the low level processing) with information from the third output (e.g., from a result of the high level processing), to perform an ADAS (or other specific automotive) operation.

Some of the description herein emphasizes the structural independence of the aspects of the system components (e.g., EE architecture 100, scalable sensor input channel 200, and a scalable domain connectivity distribution switch 300), and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "data processing system" "computing device" "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to operate electronic controller units (ECUs) across multiple ECU domains in an automotive configuration, comprising:
    a plurality of advanced driver-assistance system (ADAS) environmental sensors of a vehicle, including a global positioning system (GPS) sensor, an inertial measurement unit (IMU) sensor, and a camera;
    a plurality of ECU domains of the vehicle, including a domain for ADAS, and a plurality of non-ADAS domains including a telematics domain and an infotainment domain, each of the ECU domains comprising at least one ECU;
    a sensor connectivity switch disposed within the vehicle to transform a first output of a first sensor of the plurality of ADAS environmental sensors into data compatible with a non-ADAS domain of the plurality of non-ADAS domains and to direct the data to be processed by the non-ADAS domain and the ADAS domain;
    a first ECU disposed within the vehicle and in the non-ADAS domain, the first ECU to process the data transformed from the first output to generate a second output; and
    a second ECU disposed within the vehicle and in the domain for ADAS, to use the second output generated by the first ECU in the non-ADAS domain to perform an ADAS operation.

2. The system of claim 1, comprising:
    the sensor connectivity switch to direct a third output of a second sensor of the plurality of ADAS environmental sensors, to the second ECU,
    the second ECU is to use the second output and the third output to perform the ADAS operation.

3. The system of claim 2, comprising:
    the second ECU to combine information from the second output with information from the third output to perform the ADAS operation.

4. The system of claim 1, comprising the sensor connectivity switch to:
    determine resources of a specific type available in at least one of ECUs in the domain for ADAS and ECUs in the plurality of non-ADAS domains to process the first output, the ECUs in the plurality of non-ADAS domains including the first ECU; and
select the first ECU to direct the first output, based on the resources of the specific type available in at least one of the ECUs in the domain for ADAS and the ECUs in the plurality of non-ADAS domains to process the first output.

5. The system of claim 1, comprising the sensor connectivity switch to:
determine resources of a specific type available in at least one of ECUs in the domain for ADAS and ECUs in the plurality of non-ADAS domains to process the first output, the ECUs in the plurality of non-ADAS domains including the first ECU; and
select the first ECU to direct the first output, based on the determination and at least one priority consideration to process the first output for the ADAS operation.

6. The system of claim 1, comprising:
the sensor connectivity switch to select the first ECU instead of the second ECU in the domain for ADAS to direct the first output, based on resources available in at least the first ECU and the second ECU to process the first output.

7. The system of claim 1, comprising:
the sensor connectivity switch to provide an instruction to the first ECU to process the first output to generate the second output.

8. The system of claim 1, comprising:
a domain connectivity switch to direct the second output from the first ECU to the second ECU in the domain for ADAS.

9. The system of claim 1, wherein the first output comprises an output of at least one of the GPS sensor, the IMU sensor, the camera, a radio detection and ranging (radar) sensor, a light detection and ranging (LIDAR) sensor, an ultrasonic sensor, a vehicle to vehicle (V2V) sensor, a vehicle to infrastructure (V2I) sensor, a vehicle to device (V2D) sensor, and a vehicle to passenger (V2P) sensor.

10. The system of claim 1, wherein the first ECU comprises an ECU in a domain for at least one of telematics, infotainment, battery management, powertrain, chassis, body, passenger comfort, and security.

11. A method of operating electronic controller units (ECUs) across multiple ECU domains in an automotive configuration, comprising:
generating, by a first sensor of a plurality of advanced driver-assistance system (ADAS) environmental sensors of a vehicle, a first output, the plurality of ADAS sensors including a global positioning system (GPS) sensor, an inertial measurement unit (IMU) sensor, and a camera;
transforming, by a sensor connectivity switch, the first output to into data compatible with a non-ADAS domain of a plurality of non-ADAS domains to direct the data to be processed by the non-ADAS domain and the ADAS domain, the plurality of non-ADAS domains including a telematics domain and an infotainment domain, each of the non-ADAS domains comprising at least one ECU;
processing, by a first ECU disposed within the vehicle and in the non-ADAS domain, the data transformed from the first output to generate a second output; and
using, by a second ECU disposed within the vehicle and in a domain for ADAS, the second output generated by the first ECU in the non-ADAS domain to perform an ADAS operation.

12. The method of claim 11, comprising:
directing, by the sensor connectivity switch, a third output of a second sensor of the plurality of ADAS environmental sensors, to the second ECU; and
using, by the second ECU, the second output and the third output to perform the ADAS operation.

13. The method of claim 12, comprising:
combining, by the second ECU, information from the second output with information from the third output to perform the ADAS operation.

14. The method of claim 11, comprising:
determining, by the sensor connectivity switch, resources of a specific type available in at least one of ECUs in the domain for ADAS and ECUs in the plurality of non-ADAS domains to process the first output, the ECUs in the plurality of non-ADAS domains including the first ECU; and
selecting, by the sensor connectivity switch, the first ECU to direct the first output, based on the resources of the specific type available in at least one of the ECUs in the domain for ADAS and the ECUs in the plurality of non-ADAS domains to process the first output.

15. The method of claim 11, comprising:
determining resources of a specific type available in at least one of ECUs in the domain for ADAS and ECUs in the plurality of non-ADAS domains to process the first output, the ECUs in the plurality of non-ADAS domains including the first ECU; and
selecting the first ECU to direct the first output, based on the determination and at least one priority consideration to process the first output for the ADAS operation.

16. The method of claim 11, comprising:
selecting, by the sensor connectivity switch, the first ECU instead of the second ECU in the domain for ADAS to direct the first output, based on resources available in at least the first ECU and the second ECU to process the first output.

17. The method of claim 11, comprising:
providing, by the sensor connectivity switch, an instruction to the first ECU to process the first output to generate the second output.

18. The method of claim 11, comprising:
directing, by a domain connectivity switch, the second output from the first ECU to the second ECU in the domain for ADAS.

19. The method of claim 11, wherein the first output comprises an output of at least one of the GPS sensor, the IMU sensor, the camera, a radio detection and ranging (radar) sensor, a light detection and ranging (LIDAR) sensor, an ultrasonic sensor, a vehicle to vehicle (V2V) sensor, a vehicle to infrastructure (V2I) sensor, a vehicle to device (V2D) sensor, and a vehicle to passenger (V2P) sensor.

20. The method of claim 11, wherein the first ECU comprises an ECU in a domain for at least one of telematics, infotainment, battery management, powertrain, chassis, body, passenger comfort, and security.

* * * * *